United States Patent
Rajmohan et al.

(10) Patent No.: US 12,020,336 B2
(45) Date of Patent: Jun. 25, 2024

(54) SOCIAL MEDIA REPRESENTATION AND COLLABORATION PLATFORM FOR ENTERPRISE IT

(71) Applicant: KYNDRYL, INC., New York, NY (US)

(72) Inventors: Rajmohan, Thalasserry (IN); Rajeev Thayyil, Malappuram (IN); Kuntal Dey, Rampurhat (IN); Pramod Vadayadiyil Raveendran, Bengaluru (IN)

(73) Assignee: KYNDRYL, INC., New York, NY (US)

( * ) Notice: Subject to any disclaimer, the term of this patent is extended or adjusted under 35 U.S.C. 154(b) by 695 days.

(21) Appl. No.: 17/034,102

(22) Filed: Sep. 28, 2020

(65) Prior Publication Data

US 2022/0101450 A1 Mar. 31, 2022

(51) Int. Cl.
| | |
|---|---|
| G06Q 50/00 | (2012.01) |
| G06F 16/9536 | (2019.01) |
| G06F 21/62 | (2013.01) |
| G06Q 10/087 | (2023.01) |
| G06Q 10/101 | (2023.01) |
| G06Q 10/20 | (2023.01) |
| H04L 9/40 | (2022.01) |
| H04L 41/0806 | (2022.01) |
| H04L 41/14 | (2022.01) |
| G06V 10/40 | (2022.01) |
| G06V 30/10 | (2022.01) |

(52) U.S. Cl.
CPC ......... *G06Q 50/01* (2013.01); *G06F 16/9536* (2019.01); *G06F 21/6218* (2013.01); *G06Q 10/087* (2013.01); *G06Q 10/101* (2013.01); *G06Q 10/20* (2013.01); *H04L 41/0806* (2013.01); *H04L 41/145* (2013.01); *H04L 63/102* (2013.01); *G06V 10/40* (2022.01); *G06V 30/10* (2022.01)

(58) Field of Classification Search
None
See application file for complete search history.

(56) References Cited

U.S. PATENT DOCUMENTS

| | | | |
|---|---|---|---|
| 8,321,364 B1 | 11/2012 | Gharpure | |
| 8,489,547 B2 | 7/2013 | Ayachitula | |
| 8,868,736 B2* | 10/2014 | Bowler | H04L 43/0823 709/224 |
| 9,503,412 B1 | 11/2016 | Reiner | |
| 10,341,847 B2* | 7/2019 | Barajas Gonzalez | H04W 68/02 |
| 2009/0319537 A1 | 12/2009 | Westerfeld | |

(Continued)

FOREIGN PATENT DOCUMENTS

DE 202012013662 U1 4/2019

*Primary Examiner* — Christopher J Fibbi
(74) *Attorney, Agent, or Firm* — Dan Housley; Rupam Bhar; Calderon Safran & Wright P.C.

(57) ABSTRACT

A system and associated methods that enable social media representation and collaboration platform of enterprise information technology (IT) components that enables human-to-human, human-to-machine and machine-to-machine communications to help easily understand the set of enterprise IT components, its configuration(s), its intra/inter relationship(s), better navigation and visibility across various related components, and augmenting system troubleshooting.

20 Claims, 4 Drawing Sheets

(56) References Cited

U.S. PATENT DOCUMENTS

| | | | | |
|---|---|---|---|---|
| 2010/0156632 A1* | 6/2010 | Hyland | ............... | G08B 25/08 |
| | | | | 702/188 |
| 2014/0244816 A1* | 8/2014 | Anerousis | ........... | H04L 41/0654 |
| | | | | 709/223 |
| 2016/0188676 A1* | 6/2016 | Barker | ............... | H04L 47/762 |
| | | | | 707/770 |
| 2017/0237722 A1* | 8/2017 | Raman | ................ | H04L 63/08 |
| | | | | 726/7 |
| 2018/0335894 A1* | 11/2018 | Sarbin | ................. | H04L 51/18 |
| 2019/0354420 A1* | 11/2019 | Venkatesan | ......... | G06F 11/0751 |
| 2020/0059415 A1 | 2/2020 | Biran | | |

* cited by examiner

400

SOCIAL MEDIA REPRESENTATION AND COLLABORATION PLATFORM FOR ENTERPRISE IT

BACKGROUND

The present invention relates generally to the field of enterprise technology, and more particularly to the field of using social media as a platform for better understanding enterprise Information Technology (IT) components.

The Wikipedia entry for "Information Technology" states as follows: "Information technology (IT) is the use of computers to store, retrieve, transmit, and manipulate data or information. IT is typically used within the context of business operations as opposed to personal or entertainment technologies. IT is considered to be a subset of information and communications technology (ICT). An information technology system (IT system) is generally an information system, a communications system or, more specifically speaking, a computer system—including all hardware, software and peripheral equipment—operated by a limited group of users . . . . The term is commonly used as a synonym for computers and computer networks, but it also encompasses other information distribution technologies such as television and telephones. Several products or services within an economy are associated with information technology, including computer hardware, software, electronics, semiconductors, internet, telecom equipment, and e-commerce."

The Wikipedia entry for "Social Media" states as follows: "Social media are interactive computer-mediated technologies that facilitate the creation or sharing of information, ideas, career interests and other forms of expression via virtual communities and networks. The variety of stand-alone and built-in social media services currently available introduces challenges of definition; however, there are some common features: [i] Social media are interactive Web 2.0 Internet-based applications [;] [ii] User-generated content such as text posts or comments, digital photos or videos, and data generated through all online interactions [;] [iii] Users create service-specific profiles for the website or app that are designed and maintained by the social media organization [; and] [iv] Social media facilitate the development of online social networks by connecting a user's profile with those of other individuals or groups . . . . Users usually access social media services via web-based apps on desktops and laptops, or download services that offer social media functionality to their mobile devices (e.g., smartphones and tablets). As users engage with these electronic services, they create highly interactive platforms through which individuals, communities, and organizations can share, co-create, discuss, participate and modify user-generated content or self-curated content posted online. Networks formed through social media change the way groups of people interact and communicate or stand with the votes. They 'introduce substantial and pervasive changes to communication between organizations, communities, and individuals.'"

The Wikipedia entry for "Configuration Management Database" (CMDB) states as follows: "A configuration management database (CMDB) is an ITIL database used by an organization to store information about hardware and software assets (commonly referred to as Configuration Items [CI]). It is useful to break down configuration items into logical layers. This database acts as a data warehouse for the organization and also stores information regarding the relationships among its assets. The CMDB provides a means of understanding the organization's critical assets and their relationships, such as information systems, upstream sources or dependencies of assets, and the downstream targets of assets."

The Wikipedia entry for "Configuration Item" (CI) states as follows: "The term configuration item (CI) refers to the fundamental structural unit of a configuration management system. Examples of CIs include individual requirements documents, software, models, and plans. The configuration-management system oversees the life of the CIs through a combination of processes and tools by implementing and enabling the fundamental elements of identification, change management, status accounting, and audits. This system aims to avoid the introduction of errors related to lack of testing as well as of incompatibilities with other CIs."

SUMMARY

According to an aspect of the present invention, there is a method, computer program product and/or system that performs the following operations (not necessarily in the following order): (i) providing a first social media platform, with the social media platform including: (a) a plurality of profiles of information technology (IT) components, and (b) a plurality of profiles of authorized users; (ii) creating a first visual representation of the social media platform, with the first visual representation including information indicative of enterprise IT components; (iii) using the first visual representation of the social media platform to map a set of configuration items (CIs) to obtain a mapped set of CIs; (iv) and using the mapped set of CIs to define the relationships among and between the plurality of profiles of IT components.

DETAILED DESCRIPTION

Figure 1:
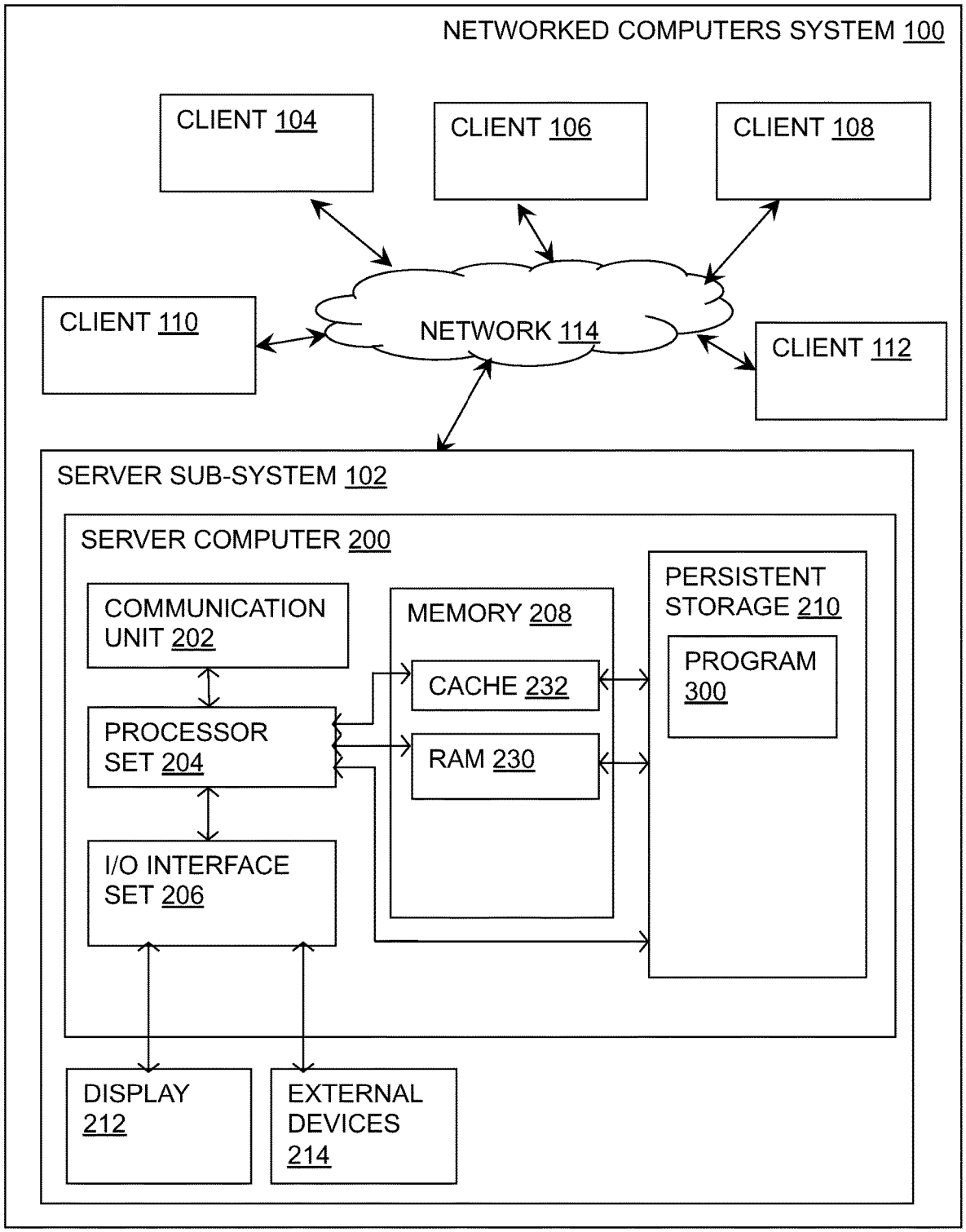
FIG. 1 is a block diagram view of a first embodiment of a system according to the present invention.

Some embodiments of the present invention are directed towards methods that enable social media representation and collaboration platform of enterprise information technology (IT) components that enables human-to-human, human-to-machine and machine-to-machine communications to help easily understand the set of enterprise IT components, its configuration(s), its intra/inter relationship(s), better navigation and visibility across various related components, and augmenting system troubleshooting.

This Detailed Description section is divided into the following sub-sections: (i) The Hardware and Software Environment; (ii) Example Embodiment; (iii) Further Comments and/or Embodiments; and (iv) Definitions.

I. THE HARDWARE AND SOFTWARE ENVIRONMENT

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208;

persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage and control certain software functions that will be discussed in detail, below, in the Example Embodiment sub-section of this Detailed Description section.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

II. EXAMPLE EMBODIMENT

Figure 2:
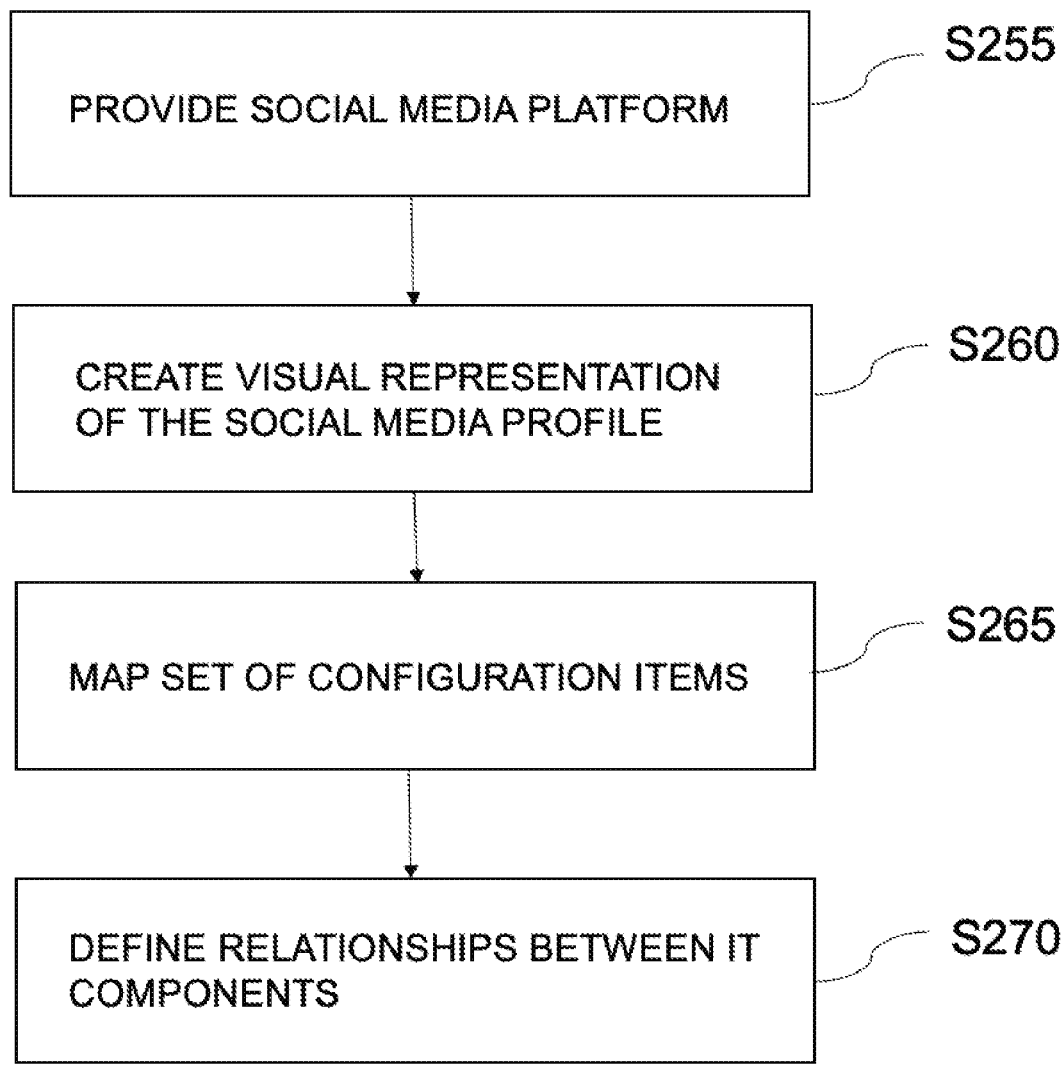
FIG. 2 is a flowchart showing a first embodiment method performed, at least in part, by the first embodiment system.
Figure 3:
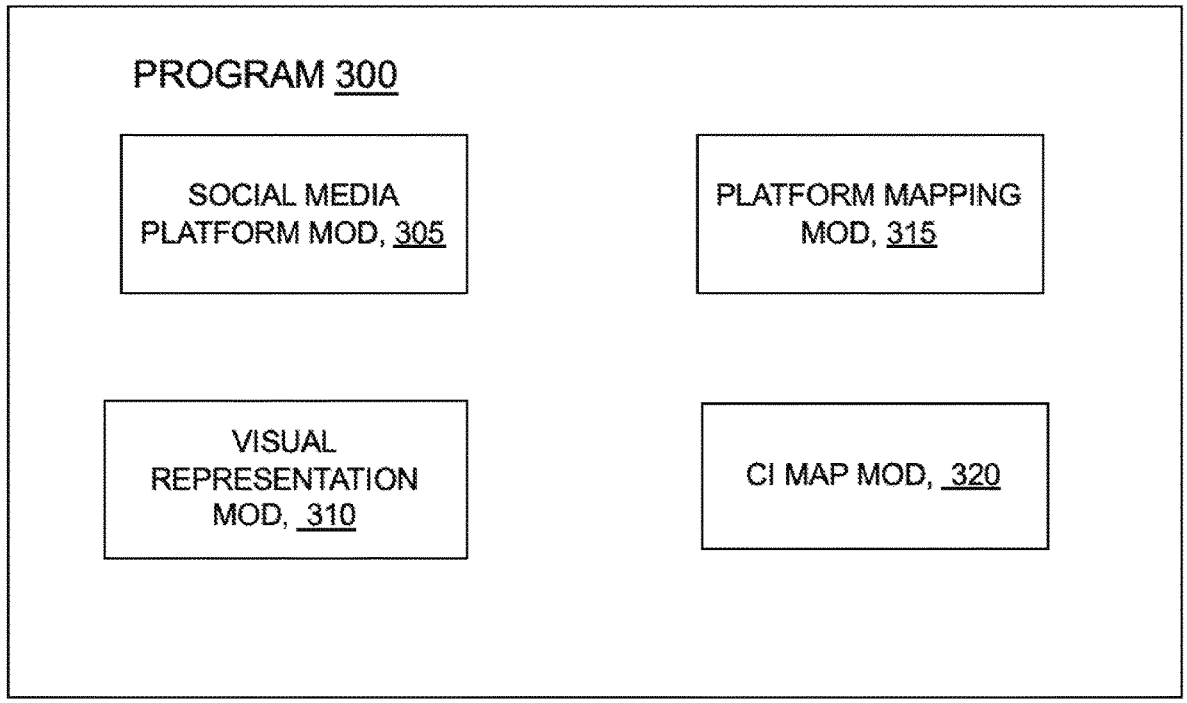
FIG. 3 is a block diagram showing a machine logic (for example, software) portion of the first embodiment system.

FIG. 2 shows flowchart 250 depicting a method according to the present invention. FIG. 3 shows program 300 for performing at least some of the method operations of flowchart 250. This method and associated software will now be discussed, over the course of the following paragraphs, with extensive reference to FIG. 2 (for the method operation blocks) and FIG. 3 (for the software blocks).

Processing begins at operation S255, where social media platform module ("mod") 305 creates and/or otherwise provide a first social media platform. In some embodiments of the present invention, the first social media platform is a private social network that is used primarily in the context of building a network of connections between members of a given company. This is in stark contrast to a typical social media platform (a public social network) where any given set of two or more individuals can be communicatively connected to one another irrespective of their company affiliation. Alternatively, the first social media platform is a typical social media platform that can allow any set of two or more users to be communicatively connected to one another.

Figure 4:
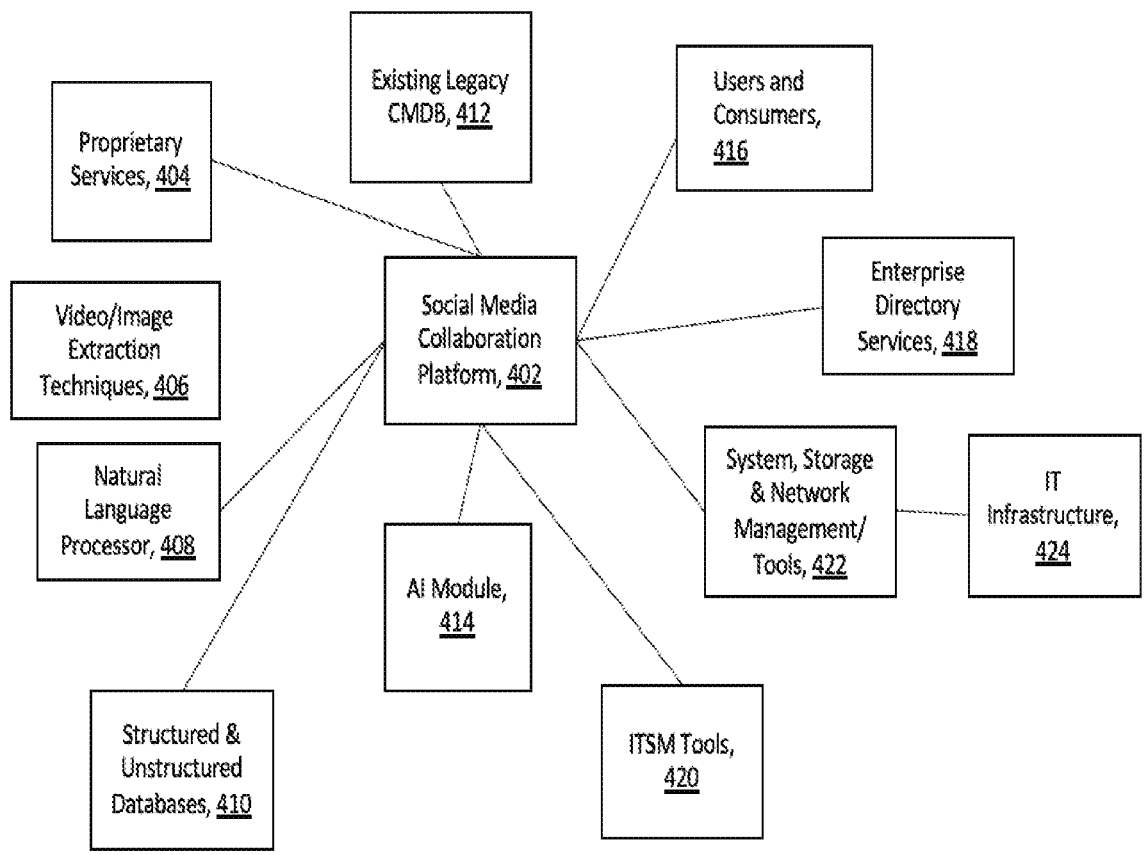
FIG. 4 is a screenshot of a system diagram showing information that is helpful in understanding embodiments of the present invention.

Processing proceeds to operation S260, where visual representation mod 310 creates a first visual representation of the social media platform from operation S255, above. This visual representation of the social media platform can be created from the various components that are shown in screenshot 400 of FIG. 4. Screenshot 400 is an exemplary and non-limiting representation of the types of components that can exist in the first visual representation of the social media platform. For example, screenshot 400 shows the following components: (i) proprietary services with native company tools 404; (ii) video/image extraction techniques 406; (iii) natural language processor 408; (iv) structured and unstructured databases 410; (v) existing legacy CMDB 412; (vi) social media and collaboration platform 402; (vii) artificial intelligence (AI) module 414; (viii) IT Service Management (ITSM) tools 420; (ix) human/human controlled user components (including users, consumers, support staff, stakeholders, owners, and enterprise robots) 416; (x) enterprise directory services 418; (xi) system, storage and network management/monitoring services 422; and (xii) IT infrastructure 424.

Processing proceeds to operation S265, where platform mapping mod 315 uses the visual representation of the social media platform to map a set of configuration items (CIs) to obtain a mapped set of CIs. At operation S265, platform mapping mod 315 uses the components found in screenshot 400 and begins to map the components together to obtain the set of configuration items. For example, platform mapping mod 315 determines which of the components (as listed above in connection with operation S260, above) are directly connected to the social media and collaboration platform. After this determination is made, platform mapping mod 315 begins to create a visual representation (that is, a visual map of the set of configuration items) of each of the relevant components to the social media and collaboration platform.

Processing finally proceeds to operation S270, where CI map mod 320 uses the mapped set of CIs to define the relationships among and between a plurality of information technology (IT) components.

III. FURTHER COMMENTS AND/OR EMBODIMENTS

Some embodiments of the present invention recognize the following facts, potential problems and/or potential areas for improvement with respect to the current state of the art: (i) using Configuration Item Details and Configuration of each CI; (ii) System, Storage and Network Management Tools; (iii) Incident/Change/Problem Management Tools; (iv) Enterprise Monitoring Tools; (v) Enterprise Directory; (vi) Natural language processors; and/or (vii) Image extraction analysis techniques.

In some embodiments, IT Service Management (ITSM) uses a variety of tools and systems such as Configuration Management Database(s) (CMDB), Incident management tools, change management tools, and the like. With the introduction of new generation workloads, enterprise IT is filled with thousands of configuration items (CIs) and the number is constantly increasing. Current CMDBs have a complex structure and lack the easily understandable relationship structure of other types of commonly used enterprise databases. In order to understand the complete picture, it is important to explore the details through complex queries (which is a time consuming job).

Current CMDBs are not necessarily in an easily readable format for newly onboarded administrators, developers, IT staff, and/or other stakeholders to understand. Most of the modern workforce typically expects a more collaborative platform than a very old CMDB database structure that holds the entirety of IT components and its relationships.

Enterprise IT components are more intelligent than ever. In the cloud era, enterprise IT workloads are in a hybrid cloud infrastructure. The current IT service management tools and practice are currently lacking better collaboration (or do not support better collaboration) among machines and humans. Human beings in this context include IT support staff, developers, consumers, other relevant stakeholders, etc.

It is very difficult to determine the architecture and connectivity model(s) of Enterprise IT components from current CMDBs. Currently, it is not possible to necessarily determine a physical operational model, architecture overview, or network connectivity model of an application from the current CMDB.

Current CMDBs are not capable of handling intelligent machines and do not augment and/or contribute to system troubleshooting. In order to bridge the above gaps, a system and associated methods to come up with a social media representation and collaboration platform (human to human, machine to machine & human to machine (IT component)) that enables better visibility, collaboration and troubleshooting within enterprise IT are provided.

Embodiments of the present invention enable social media representation and collaboration platforms of enterprise IT infrastructure components that supports human (IT stakeholders, service consumers and support staff) to human, human to machine and machine to machine communications to help easy understanding of IT components, it's various configurations, it's intra/inter relationships, better navigation and visibility across various related components, and augmenting system troubleshooting.

Embodiments of the present invention introduce a new approach of managing and collaborating with configuration items (that are typically more intelligent) in an enterprise system wherein multiple stakeholders can participate in the troubleshooting simultaneously (voluntarily and on request basis) and talk to related human and system stakeholders in natural languages.

The system enables social media like visual representation of enterprise IT wherein all systems (IT components—configuration item), supporting staff, stakeholders, etc. will be members with individual social media like profiles. Configuration details of each configuration item will be available in the individual profile with changes that can be tracked. Relationships between the IT components will be shown in the form of a dependence relationships for systems (such as a dependence tree graph) and 'Consumer/support/stakeholder/owner relationship' for human profiles. An application profile (or any group profile) will be formed as a page/group with application config details and all related dependent components of infra, compute, storage and network components part of it.

In some embodiments, each IT configuration item profile stores it's configuration and a public wall (with visibility restricted based on the need to know and permissions), where it updates the status, challenges, performance details in a non-technical (and technical) human readable form (at a specific time period or based on triggers related to immediate attention required, performance deterioration below a threshold or not able to access a dependent component, etc.) for concerned interacting humans and machines to know/understand/respond. Configuration changes are allowed in the form of natural languages as well.

In some embodiments, machine to machine, human to machine and human to human interactions happen in natural languages through their respective walls or other profile walls (based on the set of permissions) to understand more details about the issues related to each item and to get current configuration status of each item to make it more collaborative. This leads to more engaging platforms by tagging and/or (voluntarily) working together (providing/seeking suggestions, solutions, inputs, approval, etc.) with concerned individuals and communication between components that leads to faster solutions even when the end user is not readily capable to implement these solutions. The solutions, suggestions, and/or approvals provided as part of resolving the user's problem in the thread-based conversation and the evolution of it will act as input to augment the ITSM process of incident/change/problem management that enables different stakeholders of the asset to be part of the problem solving process simultaneously (unlike sequential steps followed in conventional process).

An example of this process will now be discussed below. In one example, a user can make a request to a given application through the application profile/page/group that the user is not able to access the application in their native natural language. The given application checks the details and respond that it is able to serve other users or config item(s) or tag the other user(s) where they can access for their response. Alternatively, by seeing this application response, other users can respond by saying that they can access the sought after solution. This way, troubleshooting can be augmented, which can lead that to creating an incident ticket in the respective tool with all information that it has gathered and learned during the conversation. It is important to note that these interactions (and specifically the communication protocol between the human user and the given application) mentioned herein occurs using natural language within the social media platform.

In some embodiments, each profile of the IT component (s) gives a clear picture of operational and network connectivity physical/logical diagram in the context of the entire enterprise with the help of network tools, network traces, interaction diagram by various actors related/talks to the specific profile of the IT component.

In some embodiments, feedback about performance of each configuration item (CI) can be provided in the platform and the consolidated rating helps the respective owner/stakeholder to address the issue or improve the service. In some embodiments, project management groups and/or operational groups can be formed to achieve a specific objective related to the config items. Additionally, vendors can be engaged to the platform (on-demand access to specific CI) to get their views/solutions to get faster resolutions. This can be integrated with meeting tools and if a meeting related to a specific CI need to be done, the invite can go to all relevant stakeholders.

Depending on the job role (such as architect, support specialist, stakeholder, consumer, etc.) and their set of permissions, there can be a complete overview (on a "need-to-know" basis) of the enterprise in a visual, easily navigable format with connectivity details, diagrams, stakeholders, relationships, etc. This makes for faster onboarding of new employees and faster knowledge transfer. Additionally, this process allows humans or DC robots (participant in the platform) to post photos of error messages, stranded cables or physical servers at DC in the concerned social media like profile and supports processing unstructured data and make meaningful correlations with existing inventory and related corporate knowledge databases to derive useful proactive information or faster resolution of potential problems from it.

For example, a support person going to the DC observes that some stranded cables are in a dangerous condition. He or she takes a photograph and posts the photograph in his or her profile. The platform automatically detects information from the unstructured data such as server name and tag all concerned support persons, owners, stakeholders about this issue.

In some embodiments, a new social media platform is prepared using known technologies. This social media platform will have features to import the data from existing CI inventories or Configuration Management Databases. Also, new profiles can be created or existing ones can be modified manually or automatically (by integrating with change management tools/orchestration tools).

In some embodiments, the software for social media representation of an enterprise IT infrastructure allows for the creation of human user profiles for those managing, owning, supporting, consuming the relevant content as well as all configuration Item (CI) components. Additionally, in some embodiments, the software for social media representation of an enterprise IT infrastructure shows the relationship between human to human, human to system and system to humans. Further still, vendors can also be ported to the platform with required permissions for easy collaboration. In some embodiments of the present invention, relationships between the IT components can be shown in the form of dependence relationships for systems and 'Consumer/support/stakeholder/owner relationship' for human profiles.

Various groups including systems, humans, and combination of both can be created according to the requirement for incident resolution, problem management, project management, etc. An application profile (or any group profile) can be formed as a page and/or group with application config details and all related dependent components of infra, compute, storage and network components being a part of the application profile.

In some embodiments, each system profile is enabled with options to store its configuration details with change tracking on. Each profile has its own unique profile wall where the system itself and others related to the system can write/query through comments. Additionally, tagging other relevant people related to the system is enabled.

In some embodiments, each person and his relation to the system/user/application is derived by integrating the system with identity and access management tools and enterprise directory services. Features relating to the visibility of each human or system to the profile wall of other profiles based on the right human and/or system interaction on the other profiles and their relation to the CIs is included. There is an embodiment. that allows for confidential one to one communication as well.

In some embodiments, the system is integrated with natural language processors to cater to the text-based queries, responses, and facilitating further collaboration in regional languages to remove language barriers of those human actors dealing with the system across different parts of the world.

In some embodiments, the system is also integrated with an artificial intelligent system to learn from its interaction and engagement with various systems and users. The system is integrated with network management, monitoring, and/or orchestration tools (and get network traces) to prepare the network connectivity diagram in the context of an entire IT enterprise and related to the specific components that the administrator and/or user want to compare. Physical operational diagrams and logical diagrams of each CI can be uploaded manually or the system can automatically prepare based on the network traces, orchestration/deployment logs/ scripts and relationships mentioned in the social media platform.

In some embodiments, the system is integrated with a video and/or photographic image extraction analysers so that unstructured data can be processed, meaningful correlations can be made, and the correct stakeholders can be engaged for the proactive engagement of those relevant stakeholders.

Some embodiments of the present invention recognize that every single interaction in the IT infrastructure is captured (that is, every interaction can be recorded in a tangible medium and expressed in a human understandable text-based format). For example, a discussion relating to a particular configuration item between multiple colleagues while having coffee can be captured and posted on to a social media interface that directly and/or indirectly relates to the given configuration item.

More particularly, all changes in the enterprise IT environment (relating to CIs, their dependencies, relationships, etc.) will be tracked and kept in the social media database and some of those tracked and kept changes will be displayed in the respective social media interface (in the event that an event threshold is crossed). These will be tracked and kept in the social media database when the configuration items are not performing as expected and/or when unexpected incidents (deviation from previous patterns etc.) occur.

Additionally, embodiments of the present invention provide an interface (such as a public "wall") where humans can interact with these CIs by asking questions and/or making comments about the CIs. In turn, in some embodiments, these CIs can respond to the human in a natural language format. For example, if a human asks "How are you doing today?" the system/application can respond by saying "I am doing good today" as well as provide some kind of statistics on overall performance of the CI.

IV. DEFINITIONS

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above —similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Without substantial human intervention: a process that occurs automatically (often by operation of machine logic, such as software) with little or no human input; some examples that involve "no substantial human intervention" include: (i) computer is performing complex processing and a human switches the computer to an alternative power supply due to an outage of grid power so that processing continues uninterrupted; (ii) computer is about to perform resource intensive processing, and human confirms that the resource-intensive processing should indeed be undertaken (in this case, the process of confirmation, considered in isolation, is with substantial human intervention, but the resource intensive processing does not include any substantial human intervention, notwithstanding the simple yes-no style confirmation required to be made by a human); and (iii) using machine logic, a computer has made a weighty decision (for example, a decision to ground all airplanes in anticipation of bad weather), but, before implementing the weighty decision the computer must obtain simple yes-no style confirmation from a human source.

Automatically: without any human intervention.

Module/Sub-Module: any set of hardware, firmware and/ or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method for use with a configuration management database (CMDB), the method comprising:

providing a first social media platform, with the first social media platform including: (i) a plurality of profiles of information technology (IT) components, and (ii) a plurality of profiles of authorized users;

creating a first visual representation of the first social media platform, with the first visual representation including information indicative of enterprise IT components;

using the first visual representation of the first social media platform to map a set of configuration items (CIs) to obtain a mapped set of CIs, the set of CIs including hardware and software assets of the CMDB;

using the mapped set of CIs to define the relationships among the plurality of profiles of IT components;

receiving, by the first social media platform, a visual image, with the visual image including information indicative of a damaged IT component;

extracting, from the visual image, a set of identifying features of the damaged IT component, with the set of identifying features including information indicative of a description of the damaged IT component and automatically detecting the information to tag all concerned profiles of authorized users within the first social media platform;

determining the mapped set of CIs associated with the damaged IT component, wherein the mapped set of CIs are directly connected to the first social media platform; and based on the determining, creating a visual map of the damaged IT component and the mapped set of CIs that are directly connected to the first social media platform.

2. The method of claim 1, further comprising:

automatically translating the extracted description of the damaged IT component into a text format that is in a human readable format;

posting the translated description of the damaged IT component to a first social media interface; and responsive to the posting, identifying a set of relevant authorized users to provide input on a solution to fix the damaged IT component, with the input including making correlations between existing IT component inventory information and feedback from the set of relevant authorized users.

3. The method of claim 1 wherein the enterprise IT components include a set of permissions that provides access for an authorized user to be able to perform operational functions within the enterprise.

4. The method of claim 1 wherein the plurality of profiles of IT components include information indicating configuration data of various IT components on a social media interface that provides a mechanism for updating the configuration data by a plurality of authorized users.

5. The method of claim 1, further comprising:

receiving, by the first social media platform and from the authorized user, a first troubleshooting request;

responsive to the receipt of the first troubleshooting request, creating a social media collaboration environment for one or more authorized users of the first social media platform to simultaneously provide a set of troubleshooting solutions, with the set of troubleshooting solutions being provided in a natural language format;

compiling the set of troubleshooting solutions to obtain a compiled set of troubleshooting solutions, with the compiled set of troubleshooting solutions being included in an incident ticket; and submitting, to an enterprise system administrator, an incident ticket in order to receive a first troubleshooting solution to the first troubleshooting request.

6. The method of claim 1, wherein one or more authorized users can provide, through the first social media platform, a consolidated rating for each given CI in the set of CIs, with the consolidated rating being indicative of a current performance of each given CI.

7. The method of claim 1, wherein the mapped set of CIs include a configuration of each of the CIs and the social media interface, the configuration including changes that are tracked.

8. A computer program product (CPP) comprising:

a computer-readable storage medium; and computer code stored on the computer-readable storage medium, with the computer code including instructions and data for causing one or more processors to perform operations including the following:

providing a first social media platform, with the first social media platform including: (i) a plurality of profiles of information technology (IT) components, and (ii) a plurality of profiles of authorized users;

creating a first visual representation of the first social media platform, with the first visual representation including information indicative of enterprise IT components;

using the first visual representation of the first social media platform to map a set of configuration items (CIs) to obtain a mapped set of CIs, the set of CIs including hardware and software assets of an organization utilizing the first social medium platform;

using the mapped set of CIs to define the relationships among the plurality of profiles of IT components;

receiving, by the first social media platform, a visual image, with the visual image including information indicative of a damaged IT component;

extracting, from the visual image, a set of identifying features of the damaged IT component, with the set of identifying features including information indicative of a description of the damaged IT component and automatically detecting the information to tag all concerned profiles of authorized users within the first social media platform;

determining the mapped set of CIs associated with the damaged IT component, wherein the mapped set of CIs are directly connected to the first social media platform; and based on the determining, creating a visual map of the damaged IT component and the mapped set of CIs that are directly connected to the first social media platform.

9. The CPP of claim 8, further comprising:

automatically translating the extracted description of the damaged IT component into a text format that is in a human readable format;

posting the translated description of the damaged IT component to a first social media interface; and responsive to the posting, identifying a set of relevant authorized users to provide input on a solution to fix the damaged IT component, with the input including making correlations between existing IT component inventory information and feedback from the set of relevant authorized users.

10. The CPP of claim 8, wherein the enterprise IT components include a set of permissions that provides access for an authorized user to be able to perform operational functions within the enterprise.

11. The CPP of claim 8, wherein the plurality of profiles of IT components include information indicating configuration data of various IT components on a social media interface that provides a mechanism for updating the configuration data by a plurality of authorized users.

12. The CPP of claim 8, further comprising:
receiving, by the first social media platform and from the authorized user, a first troubleshooting request;
responsive to the receipt of the first troubleshooting request, creating a social media collaboration environment for a one or more authorized users of the first social media platform to simultaneously provide a set of troubleshooting solutions, with the set of troubleshooting solutions being provided in a natural language format;
compiling the set of troubleshooting solutions to obtain a compiled set of troubleshooting solutions, with the compiled set of troubleshooting solutions being included in an incident ticket; and
submitting, to an enterprise system administrator, an incident ticket in order to receive a first troubleshooting solution to the first troubleshooting request.

13. The CPP of claim 8, wherein one or more authorized users can provide, through the first social media platform, a consolidated rating for each given CI in the set of CIs, with the consolidated rating being indicative of a current performance of each given CI.

14. The CPP of claim 8, wherein the mapped set of CIs include a configuration of each of the CIs and the social media interface, the configuration including changes that are tracked.

15. A computer system (CS) comprising:
one or more processors;
a machine readable storage device; and
computer code stored on the machine readable storage device, with the computer code including instructions and data for causing the one or more processors to perform operations including the following:
providing a first social media platform, with the first social media platform including: (i) a plurality of profiles of information technology (IT) components, and (ii) a plurality of profiles of authorized users;
creating a first visual representation of the first social media platform, with the first visual representation including information indicative of enterprise IT components;
using the first visual representation of the first social media platform to map a set of configuration items (CIs) to obtain a mapped set of CIs, the mapped set of CIs including a configuration of each of the CIs and a social media interface to interact with each of the CIs that is visible to one or more of the authorized users, wherein the CIs respond to the one or more authorized users in a natural language format, the set of CIs including hardware and software assets of an organization utilizing the first social media platform;
using the mapped set of CIs to define the relationships among the plurality of profiles of IT components;
receiving, by the first social media platform, a visual image, with the visual image including information indicative of a damaged IT component;
extracting, from the visual image, a set of identifying features of the damaged IT component, with the set of identifying features including information indicative of a description of the damaged IT component and automatically detecting the information to tag all concerned profiles of authorized users within the first social media platform;
determining the mapped set of CIs associated with the damaged IT component, wherein the mapped set of CIs are directly connected to the first social media platform; and
based on the determining, creating a visual map of the damaged IT component and the mapped set of CIs that are directly connected to the first social media platform.

16. The CS of claim 15, further comprising:
automatically translating the extracted description of the damaged IT component into a text format that is in a human readable format;
posting the translated description of the damaged IT component to the social media interface; and
responsive to the posting, identifying a set of relevant authorized users to provide input on a solution to fix the damaged IT component, with the input including making correlations between existing IT component inventory information and feedback from the set of relevant authorized users.

17. The CS of claim 15, wherein the enterprise IT components include a set of permissions that provides access for an authorized user to be able to perform operational functions within the enterprise.

18. The CS of claim 15, wherein the plurality of profiles of IT components include information indicating configuration data of various IT components on a social media interface that provides a mechanism for updating the configuration data by a plurality of authorized users.

19. The CS of claim 15, further comprising:
receiving, by the first social media platform and from the authorized user, a first troubleshooting request;
responsive to the receipt of the first troubleshooting request, creating a social media collaboration environment for a one or more authorized users of the first social media platform to simultaneously provide a set of troubleshooting solutions, with the set of troubleshooting solutions being provided in a natural language format;
compiling the set of troubleshooting solutions to obtain a compiled set of troubleshooting solutions, with the compiled set of troubleshooting solutions being included in an incident ticket; and
submitting, to an enterprise system administrator, an incident ticket in order to receive a first troubleshooting solution to the first troubleshooting request.

20. The CS of claim 15, wherein one or more authorized users can provide, through the first social media platform, a consolidated rating for each given CI in the set of CIs, with the consolidated rating being indicative of a current performance of each given CI.

* * * * *